United States Patent
Srivastava et al.

(10) Patent No.: US 12,306,963 B2
(45) Date of Patent: May 20, 2025

(54) ENCRYPTION WITH ENHANCED TWEAK GENERATION

(71) Applicant: QUALCOMM INCORPORATED, San Diego, CA (US)

(72) Inventors: Gur Prasad Srivastava, Bengaluru (IN); Tanya Mahajan, Bangalore (IN); Nicolas Thaddee Courtois, Mougins (FR); Matthew McGregor, Huntington Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 18/159,372

(22) Filed: Jan. 25, 2023

(65) Prior Publication Data
US 2024/0249000 A1    Jul. 25, 2024

(51) Int. Cl.
*G06F 21/60*   (2013.01)
*G06F 21/55*   (2013.01)
*G06F 21/79*   (2013.01)

(52) U.S. Cl.
CPC .......... *G06F 21/602* (2013.01); *G06F 21/554* (2013.01); *G06F 21/79* (2013.01)

(58) Field of Classification Search
CPC ...... G06F 21/602; G06F 21/554; G06F 21/79; H04L 9/003; H04L 9/0637; H04L 9/0631
See application file for complete search history.

(56) References Cited

U.S. PATENT DOCUMENTS

| 8,681,974 B1* | 3/2014 | Langhammer ............ H04L 9/14 380/37 |
| 2020/0285753 A1 | 9/2020 | Buendgen et al. |
| 2022/0100870 A1* | 3/2022 | Matthews, Jr. ..... G06F 21/6209 |
| 2024/0007268 A1* | 1/2024 | Yankilevich .......... H04L 9/0637 |

OTHER PUBLICATIONS

IEEE: "IEEE Standard for Cryptographic Protection of Data on Block-Oriented Storage Devices", IEEE 1619-2018 Standard for Cryptographic Protection of Data on Block-Oriented Storage Devices, IEEE Computer Society, Sponsored by the Cybersecurity and Privacy Standards Committee, Jan. 25, 2019, XP093144509, 41 pages, figures 1-4, Introduction, Sections 5 and 6, Appendix D.
International Search Report and Written Opinion—PCT/US2023/083870—ISA/EPO—Apr. 8, 2024.
Wikipedia: "Disk Encryption Theory", Wikipedia, Nov. 15, 2022, XP093144299, pp. 1-8, p. 1-p. 4.

* cited by examiner

*Primary Examiner* — Sangseok Park
(74) *Attorney, Agent, or Firm* — Smith Tempel Blaha LLC/Qualcomm

(57) ABSTRACT

Data blocks of an input data unit may be received in parallel as a data segment on a data bus. For each received data segment, tweak values corresponding to the data blocks may be generated using a key and an input vector. The data blocks may be encrypted using parallel encryption circuitry blocks, based on a symmetric block cipher that uses another key and one of the tweak values. The encrypted data blocks may be combined into an output data unit.

30 Claims, 11 Drawing Sheets

ENCRYPTION WITH ENHANCED TWEAK GENERATION

DESCRIPTION OF THE RELATED ART

A block cipher is a deterministic algorithm that encrypts a data block (commonly referred to as plaintext) using a key, to produce an encrypted data block (commonly referred to as ciphertext). So-called "tweakable" block ciphers have been developed that encrypt data using a cryptographic key and an additional input vector. The input vector need not be secret. An advantage of a tweakable block cipher may be to introduce additional variability without the burdens associated with generating another key.

A tweakable block encryption engine or system may be used in an electronic device to protect data stored in a memory. The memory may be non-volatile storage, such as flash memory or a disk. For example, a portable computing device such as a smartphone may include a system that encrypts data as the data is being stored in the non-volatile storage and decrypts data as the data is being read from the non-volatile storage. The block cipher may be a symmetric block cipher based on the Advanced Encryption Standard ("AES"). The system and may operate in a mode known as AES-XTS, where the "X" refers to an exclusive-OR ("XOR") operation followed by an encryption operation followed by another XOR operation (or "XEX"), the "T" refers to "tweakable," and the "S" refers to a ciphertext "stealing" technique. In AES-XTS, two keys are used. One key is used to perform the AES block encryption, and the other key is used to encrypt the input vector. The input vector may be the data unit size or a logical block address in the storage medium. The encrypted input vector, which may be referred to as a tweak value, is further modified with a Galois polynomial function ("GF") and an XOR operation with both the plaintext and the ciphertext of each data block. Such an encryption system may also be operable in other modes, such as AES Electronic Code Book ("AES-ECB"). Still other block encryption modes are known, but in AES-XTS and AES-ECB modes parallel encryption of blocks is possible, which may provide faster encryption.

As data storage system throughput requirements continue to increase, it would be desirable to provide accordingly improved block encryption systems.

SUMMARY OF THE DISCLOSURE

Systems, methods, and other examples are disclosed for encryption with enhanced tweak value generation.

An exemplary method for encrypting data may include receiving each of one or more data segments of an input data unit in a sequence on a data bus. Each data segment may comprise a plurality (X) of unencrypted data blocks of the input data unit. The data bus may have a size of X data blocks. The method may further include providing X tweak values for each data segment, based on a second key and an input vector. Each of the X tweak values may correspond to one of the X unencrypted data blocks. The method may still further include encrypting, using X encryption circuitry blocks in parallel, the X unencrypted data blocks of each data segment into X corresponding encrypted data blocks. Each of the X encryption circuitry blocks may use a symmetric block cipher, and the encryption may use a first key and a corresponding one of the X tweak values. The method may also include combining the encrypted data blocks into an output data unit.

An exemplary system for encrypting data may include receiving circuitry configured to sequentially receive via a data bus each of one or more data segments of an input data unit. Each data segment may comprise a plurality (X) of unencrypted data blocks of the input data unit. The data bus may have a size of X data blocks. The system may further include tweak generating circuitry configured to provide X tweak values for each data segment, based on a second key and an input vector. Each of the X tweak values may correspond to one of the X unencrypted data blocks. The system may still further include X encryption circuitry blocks configured to encrypt in parallel the X unencrypted data blocks of each data segment into X corresponding encrypted data blocks. Each of the X encryption circuitry blocks may use a symmetric block cipher, and may perform the encryption using a first key and a corresponding one of the X tweak values. The system may still further include data block combining circuitry configured to combine the encrypted data blocks into an output data unit.

Another exemplary system for encrypting data may include means for receiving each of one or more data segments of an input data unit in a sequence on a data bus. Each data segment may comprise a plurality (X) of unencrypted data blocks of the input data unit. The data bus may have a size of X data blocks. The system may further include means for providing X tweak values for each data segment, based on a second key and an input vector. Each of the X tweak values may correspond to one of the X unencrypted data blocks. The system may still further include means for encrypting in parallel the X unencrypted data blocks of each data segment into X corresponding encrypted data blocks, using a symmetric block cipher, a first key, and a corresponding one of the X tweak values. The system may also include means for combining the encrypted data blocks into an output data unit.

An exemplary data storage cryptographic system may include memory system data buffer circuitry, tweak generating circuitry, a plurality (X) of encryption circuitry blocks, and data block combining circuitry. The memory system data buffer circuitry may be configured to sequentially receive via a data bus one or more data segments of an input data unit stored in a system memory. Each data segment may comprise X unencrypted data blocks of the input data unit. The data bus may have a size of X data blocks. The tweak generating circuitry may be configured to provide X tweak values for each data segment, based on a second key and an input vector. Each of the X tweak values may correspond to one of the X unencrypted data blocks. The X encryption circuitry blocks may be configured to encrypt in parallel the X unencrypted data blocks of each data segment into X corresponding encrypted data blocks. Each of the X encryption circuitry blocks may use a symmetric block cipher, and may perform the encryption using a first key and a corresponding one of the X tweak values. The data block combining circuitry may be configured to combine the encrypted data blocks into an output data unit. The storage device data buffer circuitry may be configured to provide the output data unit to a non-volatile data storage device.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
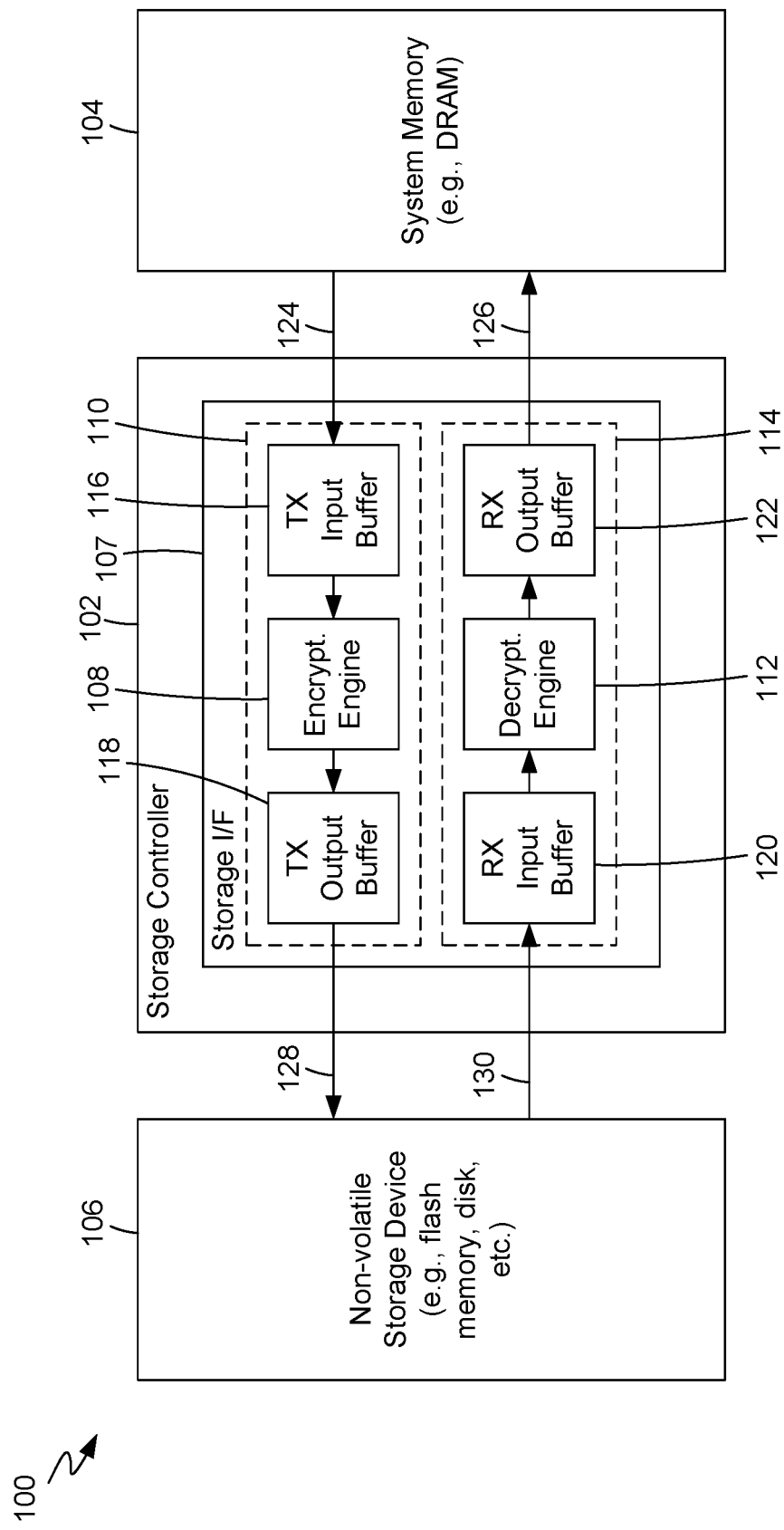
FIG. 1 is a block diagram of a data storage system having a cryptographic engine, in accordance with exemplary embodiments.

As shown in FIG. 1, in an illustrative or exemplary embodiment a system 100 may include a storage controller 102, a system memory 104, and a storage device 106. The system memory 104 may comprise dynamic random access memory ("DRAM"). The storage device 106 may be of a non-volatile type, such as flash memory, disk, etc. As understood by one of ordinary skill in the art, the storage controller 102 may among other functions, control the transfer of data from the system memory 104 to the storage device 106 and from the storage device 106 to the system memory 104. The storage controller 102 may include a storage interface 107 in addition to other components (not shown) that are well understood by one of ordinary skill in the art.

The storage interface 107 may among other functions, encrypt and decrypt the data as the data is being transferred between the system memory 104 and the storage device 106. For example, data may be stored in unencrypted form in the system memory 104 and stored in encrypted form in the storage device 106. Accordingly, an encrypting engine or system 108 may be included in the storage interface 107 in a data transfer path 110 from the system memory 104 to the storage device 106. Similarly, a decrypting engine or system 112 may be included in the storage interface 107 in a data transfer path 114 from the storage device 106 to the system memory 104. The data transfer paths 110 and 114 also may be referred to as a transmit ("TX") path 110 and a receive ("TX") path 114, respectively. The TX path 110 may include a TX input buffer 116 that receives (unencrypted) data from the system memory 104 and provides the data to the encrypting engine or system 108, which encrypts the data. The TX path 110 may also include a TX output buffer 118 that receives the encrypted data from the encrypting engine or system 108 and provides the encrypted data to the storage device 106. Similarly, the RX path 114 may include a RX input buffer 120 that receives (encrypted) data from the storage device 106 and provides the data to the decrypting engine or system 112, which decrypts the data. The RX path 114 may also include a RX output buffer 122 that receives the decrypted data from the decrypting engine or system 112 and provides the decrypted data to the system memory 104.

Data may be transferred between the storage controller 102 and the system memory 104 via one or more data buses, conceptually shown in FIG. 1 for purposes of clarity as a TX-path input bus 124 and an RX-path output bus 126. Nevertheless, as understood by one of ordinary skill in the art, such a data bus may be bidirectional, carrying data both from the storage controller 102 to the system memory 104 and from the system memory 104 to the storage controller 102. Similarly, data may be transferred between the storage controller 102 and the storage device 106 via one or more data buses, conceptually shown in FIG. 1 for purposes of clarity as a TX-path output bus 128 and an RX-path input bus 130. Nevertheless, as understood by one of ordinary skill in the art, such a data bus may be bidirectional, carrying data both from the storage controller 102 to the storage device 106 and from the storage device 106 to the storage controller 102. It should be understood that the system memory 104 and storage device 106 are intended only as examples of data sources and destinations, and in other embodiments data may be transferred, encrypted, and decrypted between other types of data sources and destinations.

Data in unencrypted form is also commonly referred to as "plaintext," regardless of whether the data represents text or something else (e.g., images, graphics, etc.). Likewise, data in encrypted form is also commonly referred to as "ciphertext," regardless of whether the data represents text or something else.

Data may be stored in the system memory 104 and storage device 106 in units that may be referred to as "data units." A data unit may comprise a sequential set of "data blocks." That is, the data unit may comprise a first data block, a second data block, etc., through a last data block. A data unit may be of any size, such as, for example, 4 kilobytes ("kB"), i.e., 4096 bytes. A data block may be of any size, such as, for example, 16 B, i.e., 128 bits.

In association with a data transfer operation from the system memory 104 to storage device 106, an input data unit comprising plaintext or unencrypted data blocks may be retrieved from the system memory 104, one data block at a time. The data blocks may be transmitted in sequence from the system memory 104 via a data bus. The receiving circuitry or logic, such as the above-described TX input buffer 116, may sequentially receive the data blocks. The data bus from which the TX input buffer 116 receives the data blocks may have a size (i.e., width) of one "data segment." A data segment may be the same size as a data block. In an example, a data segment may be two data blocks, and the data bus may have a size of two data blocks. In another example, a data segment may be four data blocks, and the data bus may have a size of four data blocks. The size of the data bus may be the same as the width of the TX input buffer 116. More generally, the TX input buffer 116 may be configured to receive a data segment comprising two or more unencrypted data blocks of the input data unit. This number of unencrypted data blocks (i.e., the size of the data segment) may be referred to as "X" in the descriptions below. Following encryption by the encrypting engine or system 108, the resulting ciphertext data blocks may be provided to the TX output buffer 118 and stored in the storage device 106 in a similar manner, i.e., in output data units comprising ciphertext data blocks.

Similarly, in association with a data transfer operation from the storage device 106 to the system memory 104, an input data unit comprising ciphertext or encrypted data blocks may be retrieved from the storage device 106, one data block at a time. The data blocks may be transmitted in sequence from the storage device 106 via a data bus. The receiving circuitry or logic, such as the above-described RX input buffer 120, may sequentially receive the data blocks in the form of a data segment. Following decryption by the decrypting engine or system 112, the resulting plaintext data blocks may be provided to the RX output buffer 122 and stored in the system memory 104 in a similar manner, i.e., in output data units comprising plaintext data blocks. The encrypting system 108 and decrypting system 112 may be configured in accordance with AES-XTS, which as described above is a well-known type of symmetric block cipher. "Symmetric" refers to the encryption and decryption operating in essentially the same way. As described below, the encrypting engine or system 108 and the decrypting engine or system 112 may have essentially the same structure.

Figure 2:
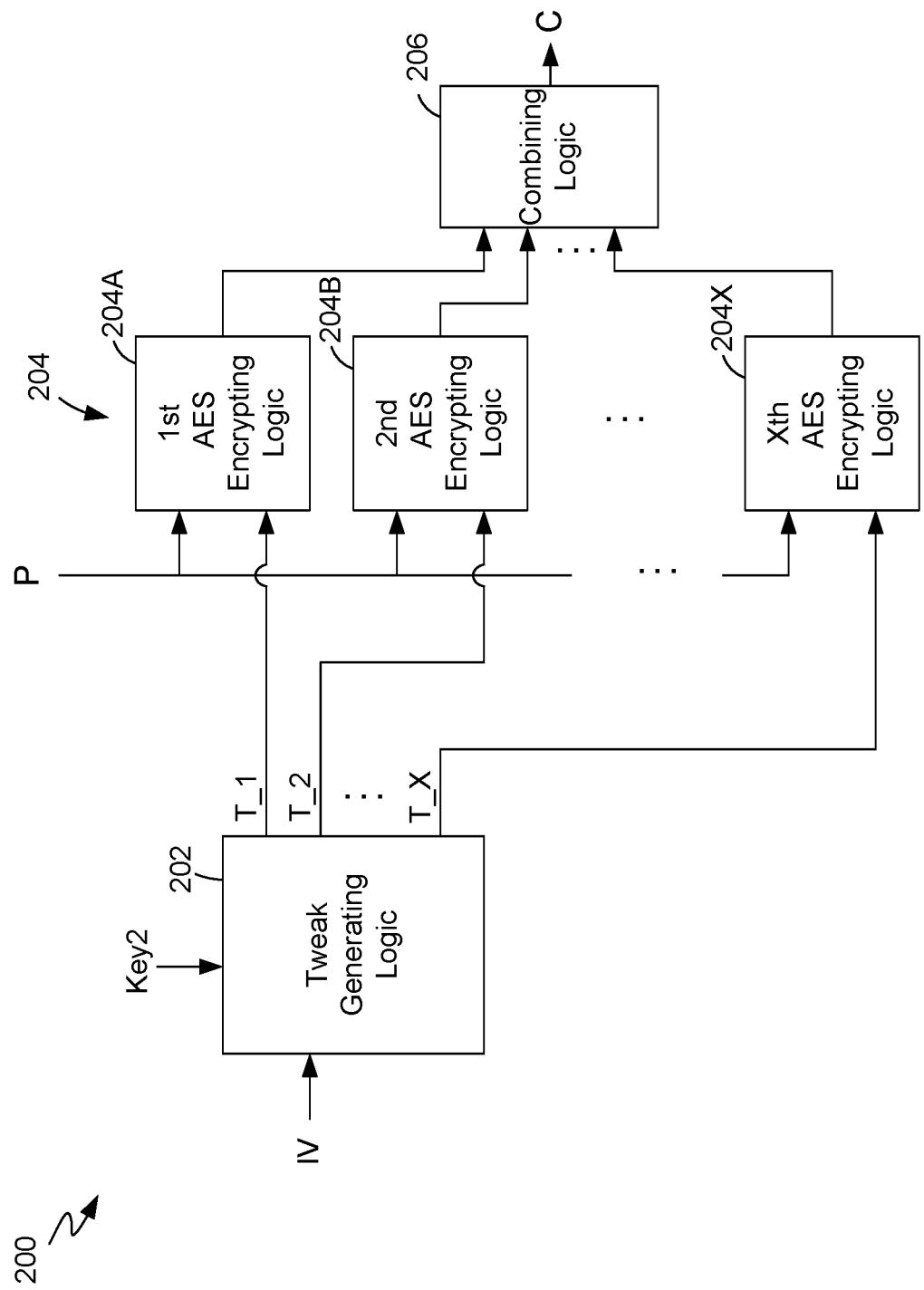
FIG. 2 is a block diagram of a data encryption system, in accordance with exemplary embodiments.

As shown in FIG. 2, in an illustrative or exemplary embodiment an encrypting system 200 may include tweak generating circuitry/logic 202, encrypting circuitry/logic blocks 204, and data block combining circuitry/logic 206. The encrypting system 200 may be an example of the above-described encrypting engine or system 108 (FIG. 1). The term "circuitry/logic" as used herein refers to electronic circuitry (i.e., hardware), which may include such elements as discrete logic gates, finite state machines, flip-flops, registers, memory elements, processors, etc., or combinations thereof. In some examples, circuitry/logic may be configured in part by operation of firmware or software. The encrypting system 200 may be configured to sequentially receive data segments as described above with regard to FIG. 1. For convenience, such circuitry/logic may be referred to as circuitry or, alternatively, as logic.

The number of encrypting logic blocks 204 may be two or more, and may be referred to herein "X". The X encrypting logic blocks 204 may comprise a first encrypting logic block 204A, a second encrypting logic block 204B, etc., through an Xth encrypting logic block 204X. (Further encrypting logic blocks 204 that may be included but are not explicitly shown for purposes of clarity are indicated by the ellipsis (" . . . ") symbol.) The X encrypting logic blocks 204 may be configured to receive corresponding unencrypted data blocks, i.e., plaintext ("P") data blocks, of the received data segment from a data bus (as described above with regard to FIG. 1). Accordingly, for example, the first encrypting logic block 204A may receive a first unencrypted data block of the data segment, a second encrypting logic block 204B may receive a second unencrypted data block of the data segment, etc., through the Xth encrypting logic block 204X, which may receive an Xth unencrypted data block of the data segment. The X encrypting logic blocks 204 may be configured to operate in parallel to encrypt the X unencrypted data blocks of the received data segment into X corresponding encrypted data blocks. Each of the X encrypting logic blocks 204 may be based on AES and accordingly may receive as inputs a first key and one of X tweak values (as described below), in addition to one of the X unencrypted data blocks of the received data segment. The first key inputs of the encrypting logic blocks 204 are not shown in FIG. 2 for purposes of clarity; rather, only the data block inputs and tweak value inputs are shown. The first key may also be referred to as Key1 or the round key, as understood by one of ordinary skill in the art.

The tweak generating logic 202 may be configured to provide the aforementioned X tweak values for each received data segment. That is, each time the system 200 receives a data segment, the tweak generating logic 202 produces X unique tweak values (i.e., no two of the X tweak values are the same) and provides a corresponding one of those X tweak values to each of the X encrypting logic blocks 204. As described below, the tweak generating logic 202 may be based on AES (e.g., AES-ECB) and accordingly may receive as inputs a second key and an input vector. The second key may also be referred to as Key2. The input vector ("IV") may be, for example, the data unit size. Each of the X tweak values may correspond to one of the X unencrypted data blocks and be provided as an input to the one of the X encrypting logic blocks 204 that is configured to receive that unencrypted data block (i.e., portion of the received data segment). In response to each received data segment and the corresponding X tweak values, the X encrypting logic blocks 204 may provide X corresponding encrypted data blocks in parallel, i.e., contemporaneously with each other.

The data block combining logic 206 may be configured to combine the X encrypted data blocks into an output data unit of ciphertext ("C"). For example, the data block combining circuitry 206 may concatenate the X encrypted data blocks.

Figure 3:
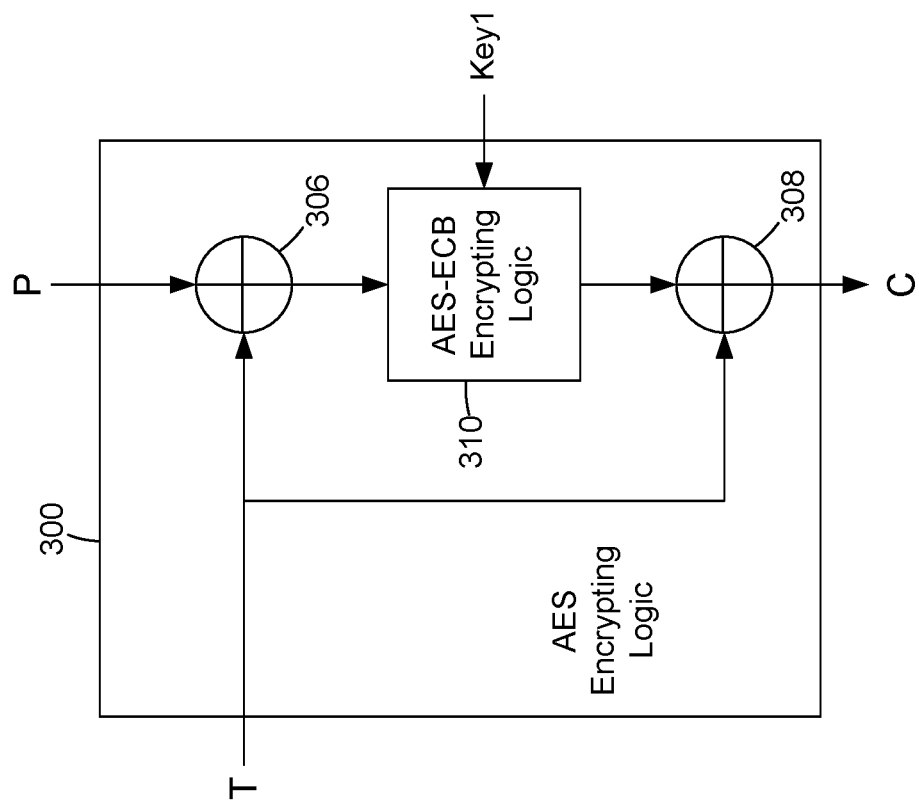
FIG. 3 is a block diagram of AES-XTS encrypting logic, in accordance with exemplary embodiments.

As shown in FIG. 3, an AES encrypting logic block 300 may be an example of each of the above-described encrypting logic blocks 204 (FIG. 2). The following is a brief description of the structure and operation of the AES encrypting logic block 300. The tweak value ("T") referred to above with regard to FIG. 2 may be provided as an input to a first exclusive-OR ("XOR") logic element 306 and as an input to a second XOR logic element 308. The first XOR logic element 306 may be configured to perform a bitwise XOR operation on the tweak value T and a plaintext ("P") or unencrypted data block. The result of this first XOR operation may be provided as an input to an AES-ECB encrypting logic block 310 that may be configured to encrypt this input using a key, which may be the first key (or Key1) described above with regard to FIG. 1. The output of the AES-ECB encrypting logic block 310 may then be provided as an input to the second XOR logic element 308. The result of this second XOR operation is the ciphertext ("C") or encrypted data block and thus forms the output of the AES-XTS encrypting logic block 300.

Figure 4:
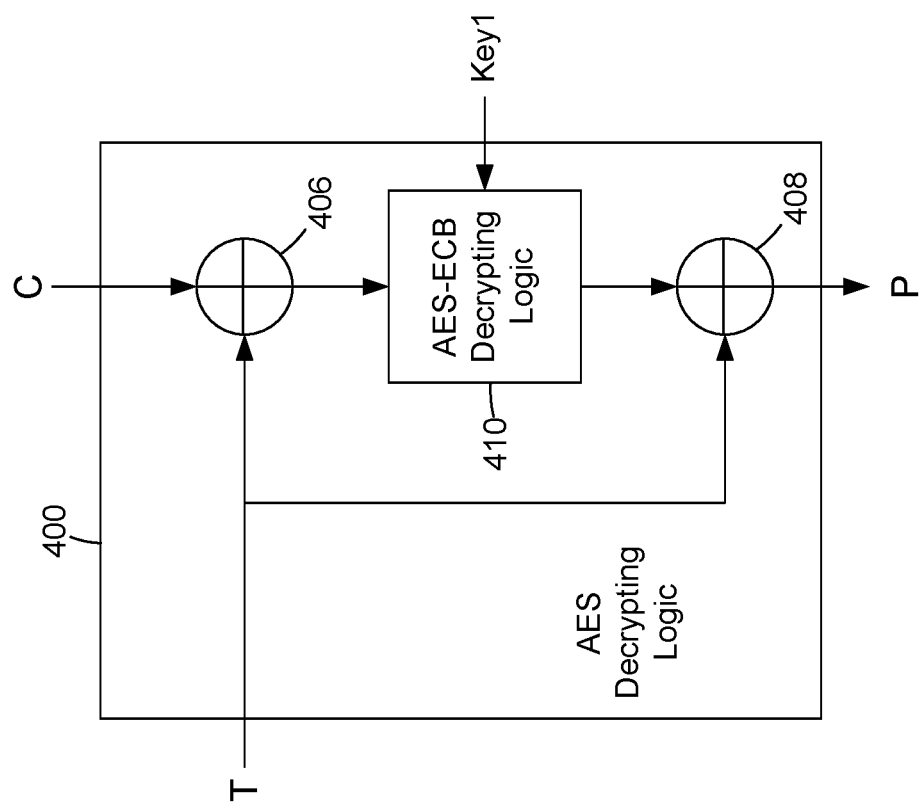
FIG. 4 is a block diagram of AES-XTS decrypting logic, in accordance with exemplary embodiments.

As shown in FIG. 4, an AES decrypting logic block 400 has a structure similar to that of the above-described encrypting logic block 300 (FIG. 3). Accordingly, the tweak value T may similarly be provided as an input to first and second XOR logic elements 406 and 408. The first XOR logic element 406 may be configured to perform a first bitwise XOR operation on the tweak value T and a ciphertext ("C") or encrypted data block. An AES-ECB decrypting logic block 410 may be configured to decrypt the result of this first XOR operation using a key, which may be the same as the first key (or Key1) described above with regard to FIG. 1. As the structure and operation of the AES-ECB decrypting logic block 410 are well understood by one of ordinary skill in the art, such details are not provided herein. The output of the AES-ECB decrypting logic block 410 may then be provided as an input to the second XOR logic element 408. The result of this second XOR operation is the plaintext ("P") or decrypted data block and thus forms the output of the AES decrypting logic block 400. Note that, as the cipher algorithm is symmetrical, the structure of the AES decrypting logic block 400 is the essentially the same as the structure of the AES decrypting logic block 300 (FIG. 3) except that the AES decrypting logic block 400 includes decrypting logic 410 where the AES encrypting logic block 300 includes encrypting logic 310.

Figure 5:
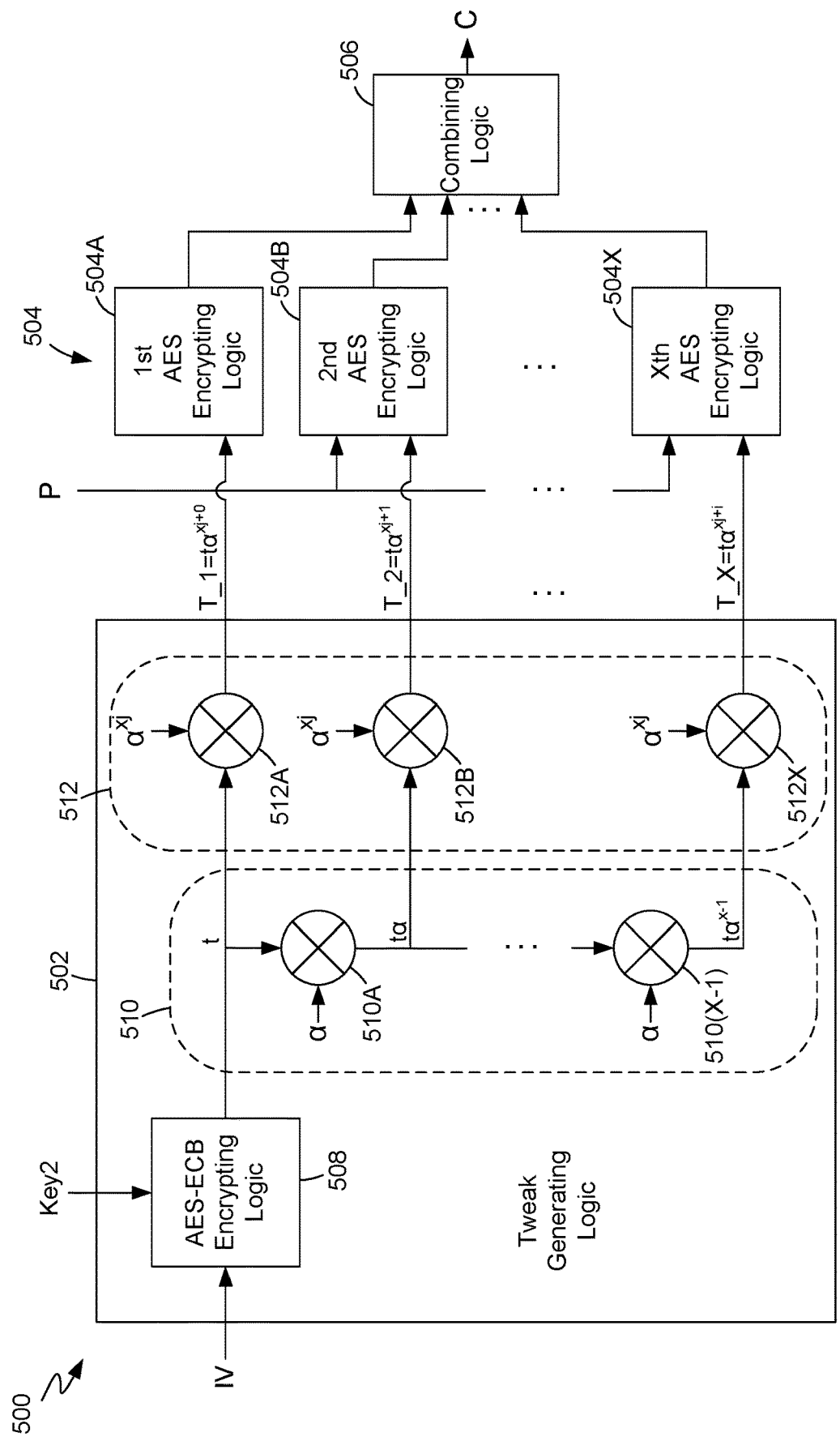
FIG. 5 is a block diagram an encryption system, in accordance with exemplary embodiments.

As shown in FIG. 5, an encrypting system 500 may include tweak generating logic 502, X encrypting logic blocks 504, and data block combining logic 506. The encrypting system 500 may be an example of the above-described encrypting system 200 (FIG. 2) or 108 (FIG. 1). The X encrypting logic blocks 504 may comprise a first encrypting logic block 504A, a second encrypting logic block 504B, etc., through an Xth encrypting logic block 504X. As the encrypting logic blocks 504 may have the same structure and function as the above-described encrypting logic blocks 204 (FIG. 2), such aspects are not described again with regard to FIG. 5. The following description of the structure and operation of the tweak generating logic 502 may be an example of the structure and operation of the tweak generating logic 202 (FIG. 2).

The tweak generating logic 502 may include an AES-ECB encrypting logic block 508 that is configured to encrypt an input vector using the second key. The result or encrypted input vector may also be referred to for convenience as an initial tweak multiplier ("t").

The tweak generating logic 502 may further include a first set of X−1 modular polynomial multipliers 510, where, as described above, X is greater than one. That is, the X−1 modular polynomial multipliers 510 may include a first modular polynomial multiplier 510A, a second modular polynomial multiplier (not shown), etc., through a last or (X−1)th modular polynomial multiplier 510(X−1). The modular polynomial multipliers 510 thus have an order, from first to (X−1)th (or last), and may be described in terms of previous and next polynomial multipliers 510 in the order. The output of a previous modular polynomial multiplier 510 may be coupled to an input of the next modular polynomial multiplier 510. The modular polynomial multipliers 510 may be configured to multiply by the Galois Field ("GF") primitive element $\alpha$. The GF primitive element $\alpha$ may be specified by a standard (e.g., AES) or otherwise known to one of ordinary skill in the art. For example, $\alpha$ may be a primitive element of $GF(2^{128})$. One input of each of the modular polynomial multipliers 510 is configured to receive $\alpha$, and the other input of each of the modular polynomial multipliers 510 is coupled to the output of the previous modular polynomial multiplier 510, with the exception that an input of the first modular polynomial multiplier 510A is not coupled to the output of another modular polynomial multiplier 510 but rather is configured to receive the initial tweak multiplier t.

In accordance with the above-described configuration, the first modular polynomial multiplier 510A produces an output of $t\alpha$, the second modular polynomial multiplier (not shown) produces an output of $t\alpha^2$, etc., through the (X−1)th modular polynomial multiplier 510(X−1), which produces an output of $t\alpha^{x-1}$. In other words, the first set of X−1 modular polynomial multipliers 510 produces an output comprising X−1 additional or further tweak multiplier values (i.e., further or in addition to the initial tweak multiplier value t). The X−1 further tweak multiplier values may comprise the initial tweak multiplier value multiplied by integer powers of $\alpha$ in a range from one through X−1.

The tweak generating logic 502 may further include a second set of X modular polynomial multipliers 512. That is, the second set of X modular polynomial multipliers 512 may include a first modular polynomial multiplier 512A, a second modular polynomial multiplier 512B, etc., through an Xth modular polynomial multiplier 512X. The second set of X modular polynomial multipliers 512 may be configured to multiply the initial tweak multiplier value and each of the further tweak multiplier values by an (Xj)th power of $\alpha$, where j is the sequential number within the input data unit of the received data segment. The number j may range from 0 to one less than: the input data unit size divided by a data block size, divided by X. That is, j may range from 0 to a number that may be determined using the following equation:

$$((\text{input\_data\_unit\_size}/\text{data\_block\_size})/X)-1 \quad \text{Eqn. (1)}$$

In an example in which the input data unit size is 4 k (i.e., 4096B), the data block size is 16B, and each received data segment contains the data of two data blocks (i.e., X=2), j may range from 0 to 127: (4096/16)/2)−1=127. In an example in which the input data unit size is 4 k (i.e., 4096B), the data block size is 16B, and each received data segment contains the data of four data blocks (i.e., X=4), j may range from 0 to 63: (4096/16)/4)−1=63.

It may be appreciated that: when j=0, the tweak generating logic 502 produces tweak values T_1, T_2, etc., through T_X that correspond to the first group of X data blocks of the input data unit; when j=1, the tweak generating logic 502 produces tweak values T_1, T_2, etc., through T_X that correspond to the next four data blocks of the input data unit; etc., until when j is equal to the number determined using Equation 1 above, the tweak generating logic 502 produces tweak values T_1, T_2, etc., through T_X that correspond to the last group of X data blocks of the input data unit. The value of j may be incremented each time the next data segment (representing the next group of X data blocks of the input data unit) is received.

Although there may be other ways of computing the X tweak values, there may be advantages to the above-described architecture, in which the first set of X modular polynomial multipliers 510 computes powers of $\alpha$ multiplied by the initial tweak multiplier value, and the second set of X modular polynomial multipliers 512 then computes the X tweak values. The first set of X modular polynomial multipliers 510 may perform their computations when Key2 is changed, and the results of those computations may be re-used several times, while the second set of X modular polynomial multipliers 512 may perform their computations more frequently (i.e., for each j) and produce unique tweak values for each clock cycle.

The results of the above-described multiplications by the second set of X modular polynomial multipliers 512 comprise the X tweak values T_1, T_2, etc., through T_X, which are then provided as inputs to the X encrypting logic blocks 504. Each of the X encrypting circuitry/logic blocks 504 is configured to receive a corresponding one of the X tweak values. That is, the first encrypting logic block 504A receives a first tweak value T_1 equal to $t\alpha^{Xj}$, the second encrypting logic block 504B receives a second tweak value T_1 equal to $t\alpha^{Xj+1}$, etc., through the Xth encrypting logic block 504X, which receives an Xth tweak value T_X equal to $t\alpha^{Xj+i}$, where the integer i is equal to X−1.

Each encrypting circuitry/logic block 504 encrypts the corresponding data block it receives from the data segment and produces an encrypted data block. The combining logic 506 then combines the encrypted data blocks into an output data unit.

Figure 6:
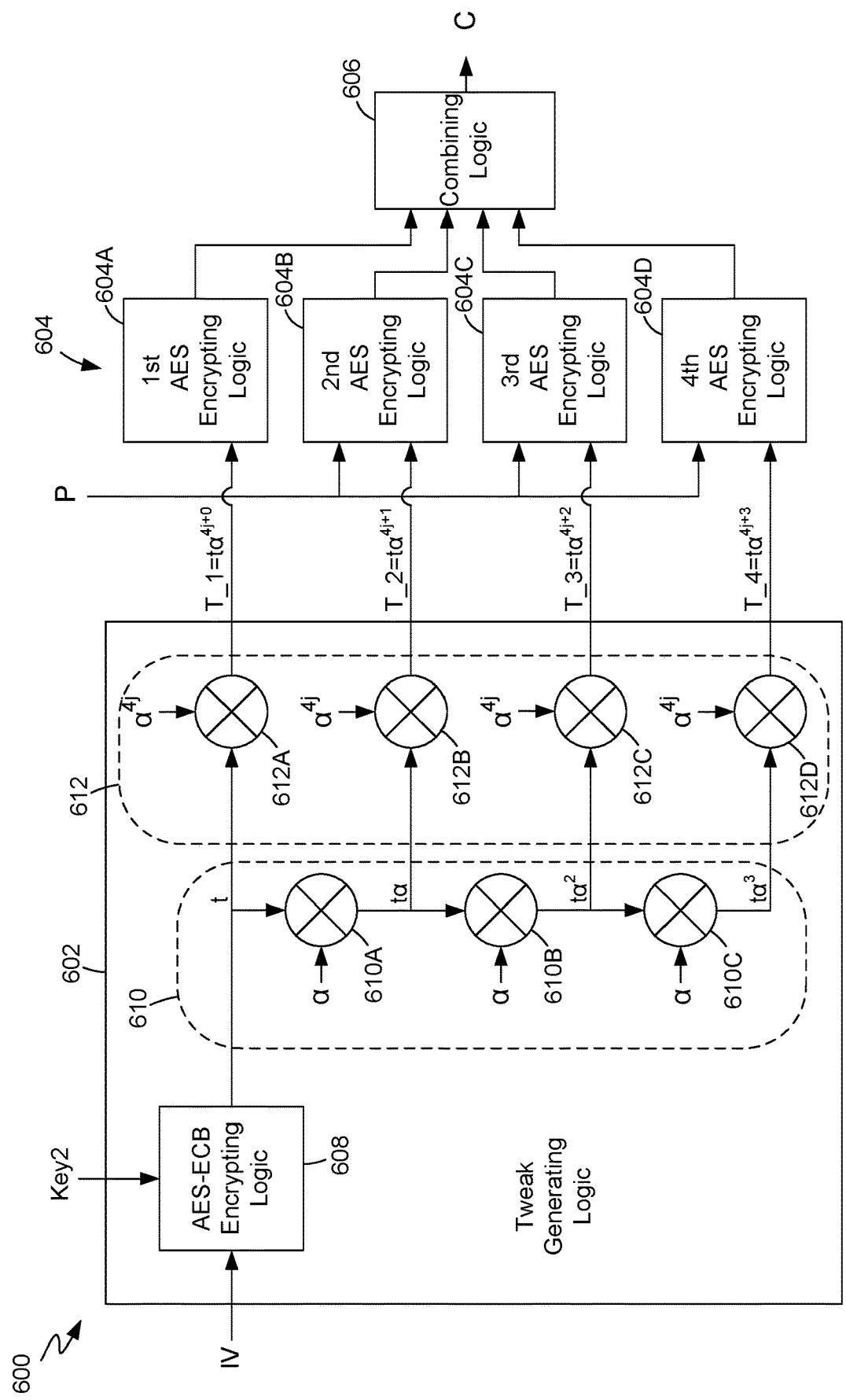
FIG. 6 is similar to FIG. 5, showing an example of the encryption system in which four data blocks are encrypted in parallel, in accordance with exemplary embodiments.

In FIG. 6, an example of an encrypting system 600 is shown in which each received data segment contains the data of four data blocks (i.e., X=4). The encrypting system 600 may include tweak generating logic 602, four encrypting logic blocks 604A, 604B, 604C, and 604D (collectively, encrypting logic blocks 604), and data block combining circuitry/logic 606. The encrypting system 600 may be an example of the above-described encrypting system 500 (FIG. 5). Accordingly, the encrypting logic blocks 604 may have the same structure and function as the above-described encrypting logic blocks 504 (FIG. 5). The tweak generating logic 602 may include an AES-ECB encrypting logic block 608, which may have the same structure and function as the above-described AES-ECB encrypting logic block 508 (FIG. 5). The AES-ECB encrypting logic block 608 may produce an initial tweak multiplier value t.

The tweak generating logic 602 may further include a first set of three modular polynomial multipliers 610A, 610B, and 610C (collectively, modular polynomial multipliers 610). The first modular polynomial multiplier 610A is configured to produce an output of $t\alpha$, the second modular polynomial multiplier 610B is configured to produce an output of $t\alpha^2$, and the third modular polynomial multiplier 610C is configured to produce an output of $t\alpha^3$. The first set of three modular polynomial multipliers 610 thus produces three further tweak multiplier values: $t\alpha$, $t\alpha^2$, and $t\alpha^3$.

The tweak generating logic 602 may further include a second set of four modular polynomial multipliers 612A, 612B, 612C, and 612D (collectively, modular polynomial multipliers 612). The first modular polynomial multiplier 612A is configured to produce an output of $T\_1 = t\alpha^{Xj}$, the second modular polynomial multiplier 612B is configured to produce an output of $T\_2 = t\alpha^{Xj+1}$, the third modular polynomial multiplier 612C is configured to produce an output of $T\_3 = t\alpha^{Xj+2}$, and the fourth modular polynomial multiplier 612D is configured to produce an output of $T\_4 = t\alpha^{Xj+3}$.

It may be appreciated that in the example represented by the system 600: when j=0, the tweak generating logic 602 produces tweak values T_1, T_2, T_3, and T_4 that correspond to the first group of four data blocks of the input data unit; when j=1, the tweak generating logic 602 produces tweak values T_1, T_2, T_3, and T_4 that correspond to the next four data blocks of the input data unit; etc., until when j is equal to the number determined using Equation 1 above, the tweak generating logic 602 produces tweak values T_1, T_2, T_3, and T_4 that correspond to the last group of four data blocks of the input data unit. In this example, the value of j may be incremented each time the next data segment (representing the next group of four data blocks of the input data unit) is received.

Using the corresponding tweak value that it receives, each encrypting logic block 604 encrypts the one of the four data blocks it receives from the data segment and produces a corresponding encrypted data block. The combining logic 606 then combines the four encrypted data blocks into an output data unit.

Figure 7:
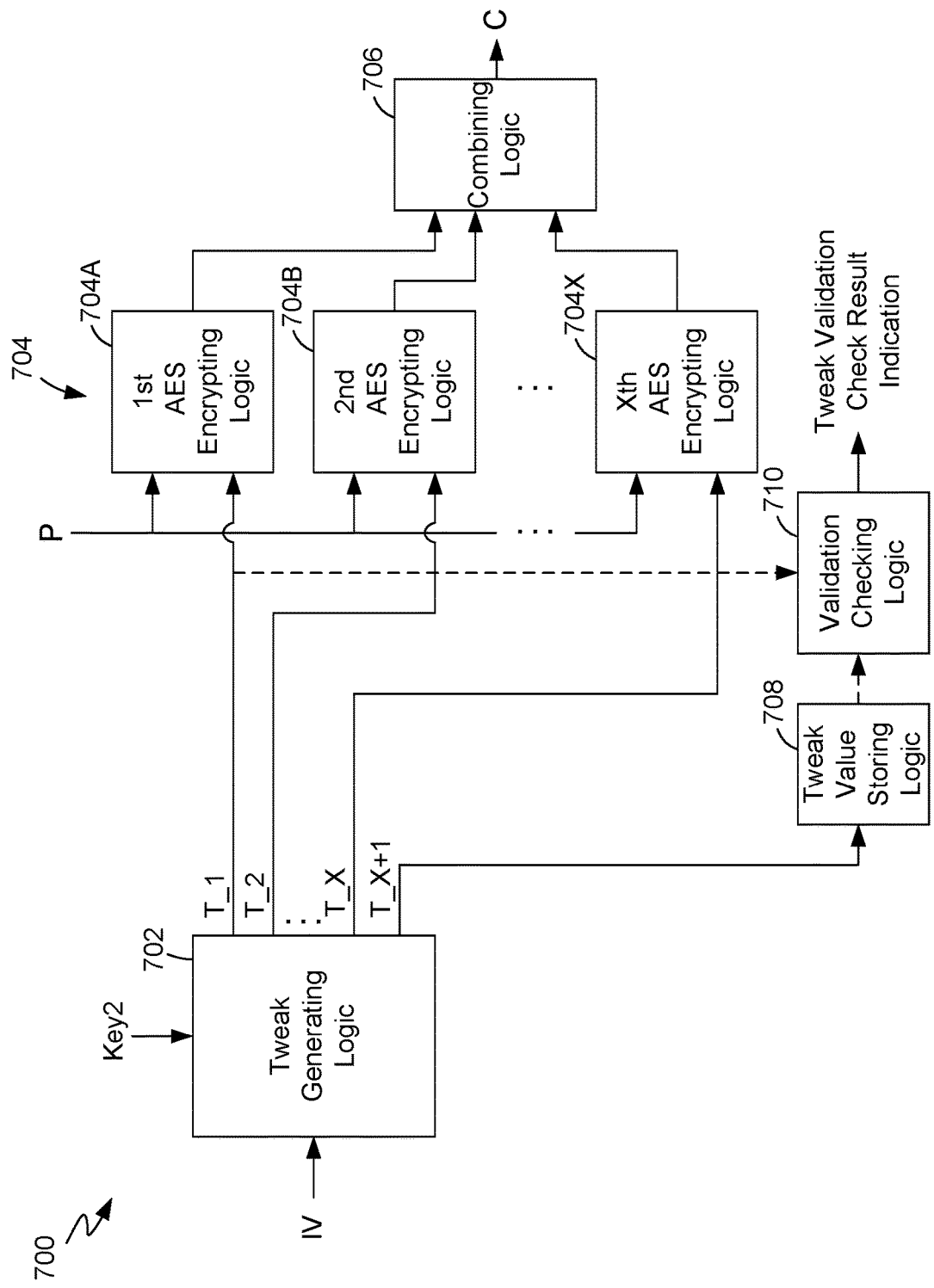
FIG. 7 is a block diagram of an encryption system having a validation checking feature, in accordance with exemplary embodiments.

As shown in FIG. 7, an encrypting system 700 may include, in addition to tweak generating logic 702, encrypting logic blocks 704, data block combining logic 706, tweak value storing logic 708, and validation checking logic 710. The tweak generating logic 702, encrypting logic blocks 704A, 704B, etc., through 704X (collectively, encrypting logic blocks 704), and data block combining logic 706 may be similar to the tweak generating logic 502, encrypting logic blocks 504, and data block combining logic 506, respectively, described above with regard to FIG. 5. The system 700 is similar to the above-described system 500 in that the tweak generating logic 702 is configured to produce X tweak values, each corresponding to one of the X encrypting logic blocks 704 to which that tweak value will be provided as an input. The encrypting system 700 differs from the above-described encrypting system 500 in that the tweak generating logic 702 is configured to produce an additional, i.e., (X+1)th, tweak value. Whereas, as described above, the last tweak value that is produced may be referred to as T_X, the additional tweak value that is produced may be referred to as T_X+1.

The tweak generating circuitry/logic 702 may produce the additional tweak value T_X+1 in a manner similar to the above-described manner in which the tweak generating logic 702 produces the X tweak values T_1-T_X (i.e., based on the input vector, the second key, the values of X, $\alpha$, and j, etc.). Whereas in the above-described system 500 (FIG. 5) the last tweak value T_X is equal to $t\alpha^{Xj+i}$ (where i=X−1), in the system 700 the additional tweak value T_X+1 is equal to $t\alpha^{Xj+X}$. As in the above-described encrypting systems 500 (FIG. 5) and 600 (FIG. 6), the value of X in the encrypting system 700 is equal to the number of data blocks in each received data segment and is also equal to the number of encrypting logic blocks 704. Note that the additional tweak value T_X+1 does not correspond to a data block of the data segment.

The additional tweak value may be used to validate the result produced by the encrypting system 700. This validation may enhance security by, for example, helping detect an attack. As understood by one of ordinary skill in the art, an attacker may attempt to corrupt operation of chip circuitry by, for example, injecting a fault using a laser or by inducing a voltage glitch.

After the additional tweak value T_X+1 is produced, it may be stored and then compared with another tweak value. The tweak value storing logic 708 may be configured to store the additional tweak value T_X+1. The validation checking logic 710 may be configured to perform the comparison with another tweak value. For example, the tweak value storing logic 708 may store the additional tweak value T_X+1 during encryption of a jth data segment, and then the validation checking logic 710 may compare that stored value with the first tweak value T_1 that is produced during encryption of a (j+1)th data segment. If the first tweak value T_1 produced during the processing of the currently received data segment is not equal to the additional tweak value T_X+1 produced during the immediately preceding or previous data segment, the system 700 may have produced incorrect results. The validation checking logic 710 may produce a tweak validation check result indication based on the result of this comparison, and the indication may trigger an action. For example, if the validation checking logic 710 determines that these tweak values are not equal, the validation checking logic 710 may initiate an action, such as alerting an operator of the potential attack or malfunction. Other examples of such actions that the validation checking logic 710 may initiate if it determines that these tweak values are not equal include modifying the operation of the memory system to, for example, substitute randomly generated data, dummy data (e.g., all "1"s or all "0s"), or other data in place of the results of the encryption operations. In other words, this substitute data may replace what would otherwise have been ciphertext output in the data transfer stream. Replacing the ciphertext output with substitute data may deny an attacker access to information that the attacker could use in attempting to break the encryption.

Figure 8:
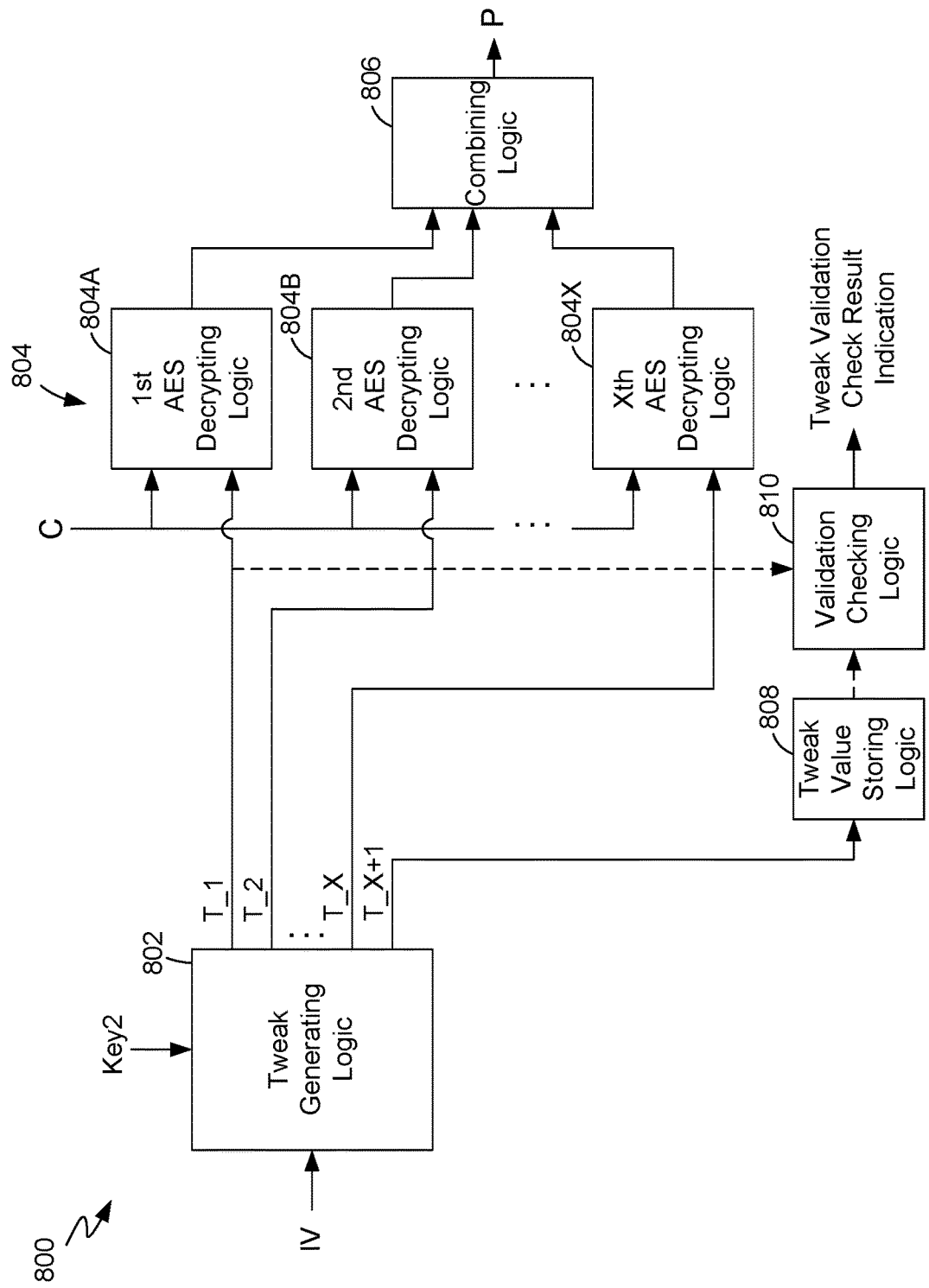
FIG. 8 is a block diagram of a decryption system having a validation checking feature, in accordance with exemplary embodiments.

As shown in FIG. 8, a decrypting system 800 may include tweak generating logic 802, decrypting logic blocks 804A, 804B, etc., through 804X (collectively, decrypting logic blocks 804), data block combining logic 806, tweak value storing logic 808, and validation checking logic 810. The tweak generating logic 802, data block combining logic 806, tweak value storing logic 808, and validation checking logic 810 may be similar to the tweak generating logic 702, data block combining logic 706, tweak value storing logic 708, and validation checking logic 710 described above with regard to FIG. 7. The decrypting system 800 differs from the above-described encrypting system 700 (FIG. 7) in that the decrypting system 800 includes the decrypting logic blocks 804 where the encrypting system 700 includes encrypting logic blocks 704, and in that the decrypting system 800 receives a ciphertext ("C") input data unit and produces a plaintext ("P") output data unit where the encrypting system 700 receives a plaintext input data unit and produces a ciphertext output data unit.

Figure 9:
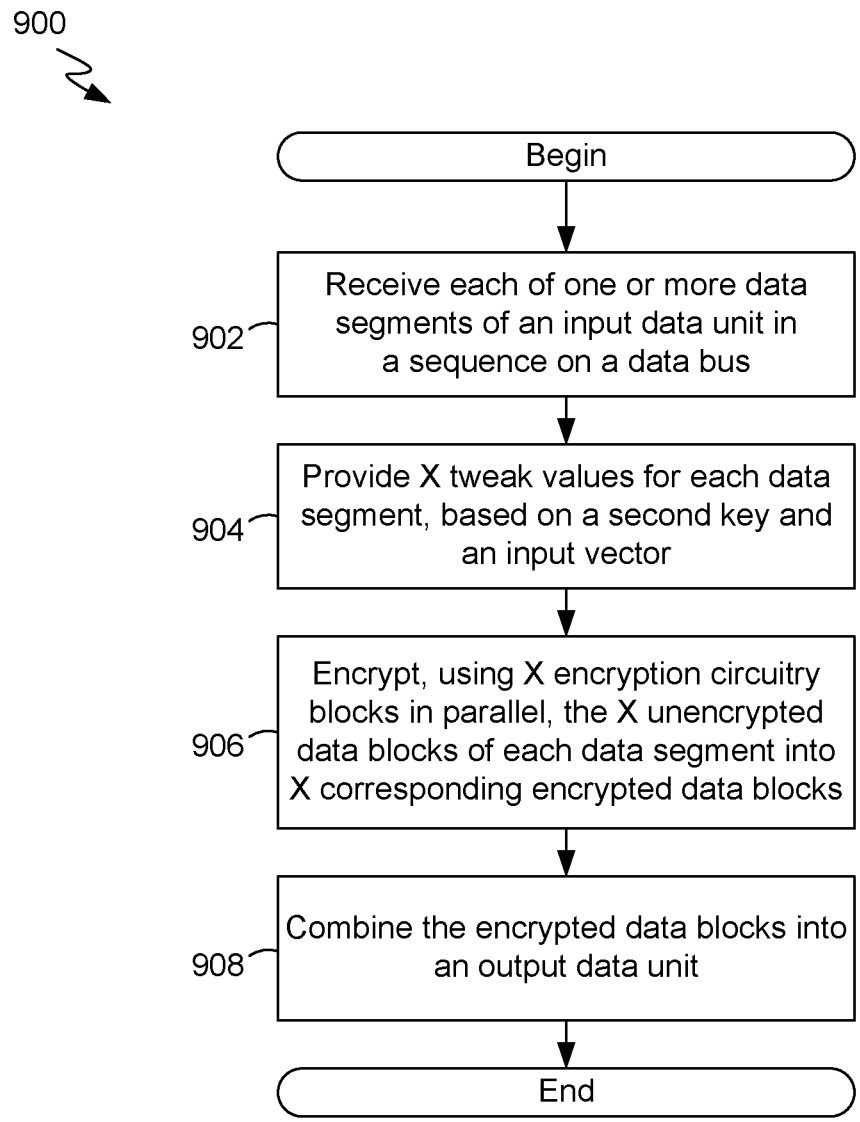
FIG. 9 is a flow diagram illustrating a method for encrypting data, in accordance with exemplary embodiments.

In FIG. 9, a method 900 for encrypting data is shown in block diagram form. As indicated by block 902, the method 900 may include receiving each of one or more data segments of an input data unit in a sequence on a data bus. The encrypting logic blocks 204 (FIG. 2) may be an example of a means for receiving the data segments from the data bus. The sequence in which the data segments are received on the data bus may correspond to the sequence of data blocks in an input data unit. The data bus may have a size (i.e., width) of X data blocks, where X is greater than one. Each data segment may comprise X plaintext or unencrypted data blocks of the input data unit. For example, the first data segment that is received may comprise the first X data blocks of the input data unit, and the second data segment that is received may comprise the next X data blocks of the input data unit, etc.

As indicated by block 904, the method 900 may further include providing X tweak values for each data segment that is received. The tweak generating logic 202 (FIG. 2) may be an example of a means for providing the X tweak values. Each of the X tweak values may correspond to one of the X unencrypted data blocks of the data segment. Providing the tweak values may include encrypting an input vector using a second key. Although this reference to a key may precede the reference below to the other key involved in the method 900, this key is referred to as the "second" key.

As indicated by block 906, the method 900 may still further include encrypting the X plaintext or unencrypted data blocks of each data segment into X corresponding ciphertext or encrypted data blocks. The encrypting may use X encryption circuitry/logic blocks operating in parallel. Each of the X encryption circuitry/logic blocks may use a symmetric block cipher and may encrypt the data block using a first key and a corresponding one of the X tweak values. The X encrypting logic blocks 204 (FIG. 2) may be an example of a means for providing the X corresponding encrypted data blocks.

As indicated by block 908, the method 900 may also include combining the encrypted data blocks into an output data unit. For example, the combining may include concatenating the encrypted data blocks. The data block combining logic 206 (FIG. 2) may be an example of a means for combining the X encrypted data blocks.

A decryption method is not explicitly shown in block diagram form but would be similar to the encryption method 900. Instead of block 906 in the encryption method indicating encrypting, a similar block in a decryption would indicate decrypting. Instead of the input data unit in the encryption method 900 comprising plaintext or unencrypted data, the input data unit in a decryption method would comprise ciphertext or encrypted data. Likewise, instead of the output data unit in the encryption method 900 comprising ciphertext or encrypted data, the output data unit in a decryption method would comprise plaintext or unencrypted data.

Figure 10:
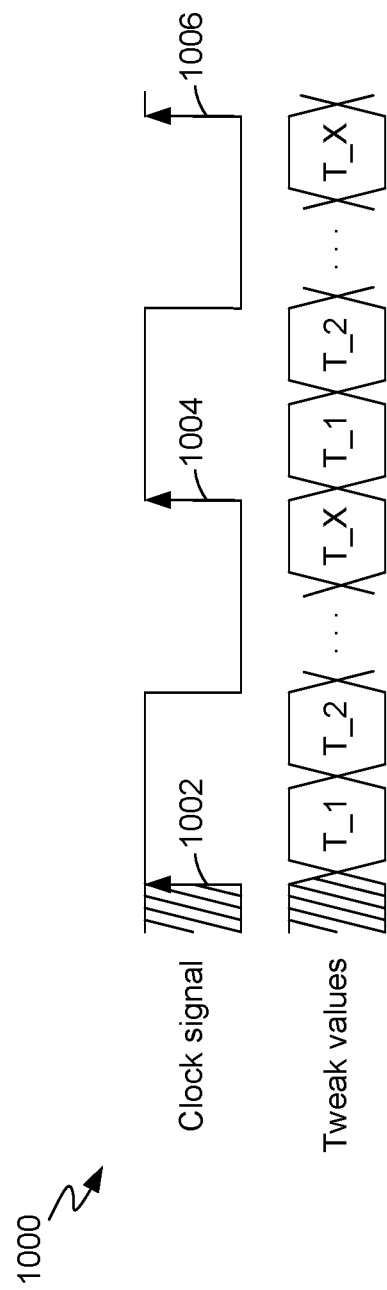
FIG. 10 is a timing diagram for an encryption system in operation, in accordance with exemplary embodiments.

In FIG. 10, a timing diagram 1000 illustrates aspects of the operation of a system for encrypting data in an exemplary embodiment. In a system in which each received data segment contains the data of X data blocks, the system may produce X unique tweak values $T\_1$, $T\_2$, etc., through $T\_X$ every clock cycle. As shown in FIG. 10, X unique tweak values $T\_1$ through $T\_X$, corresponding to a first group of X data blocks of the input data unit, are produced during a first clock cycle that begins at a first rising edge 1002 of a clock signal and ends at a second rising edge 1004 of the clock signal. A further X unique tweak values $T\_1$ through $T\_X$, corresponding to a second group of X data blocks of the input data unit, are produced during a second clock cycle that begins at the second rising edge 1004 of the clock signal and ends at a third rising edge 1006, and so forth.

Figure 11:
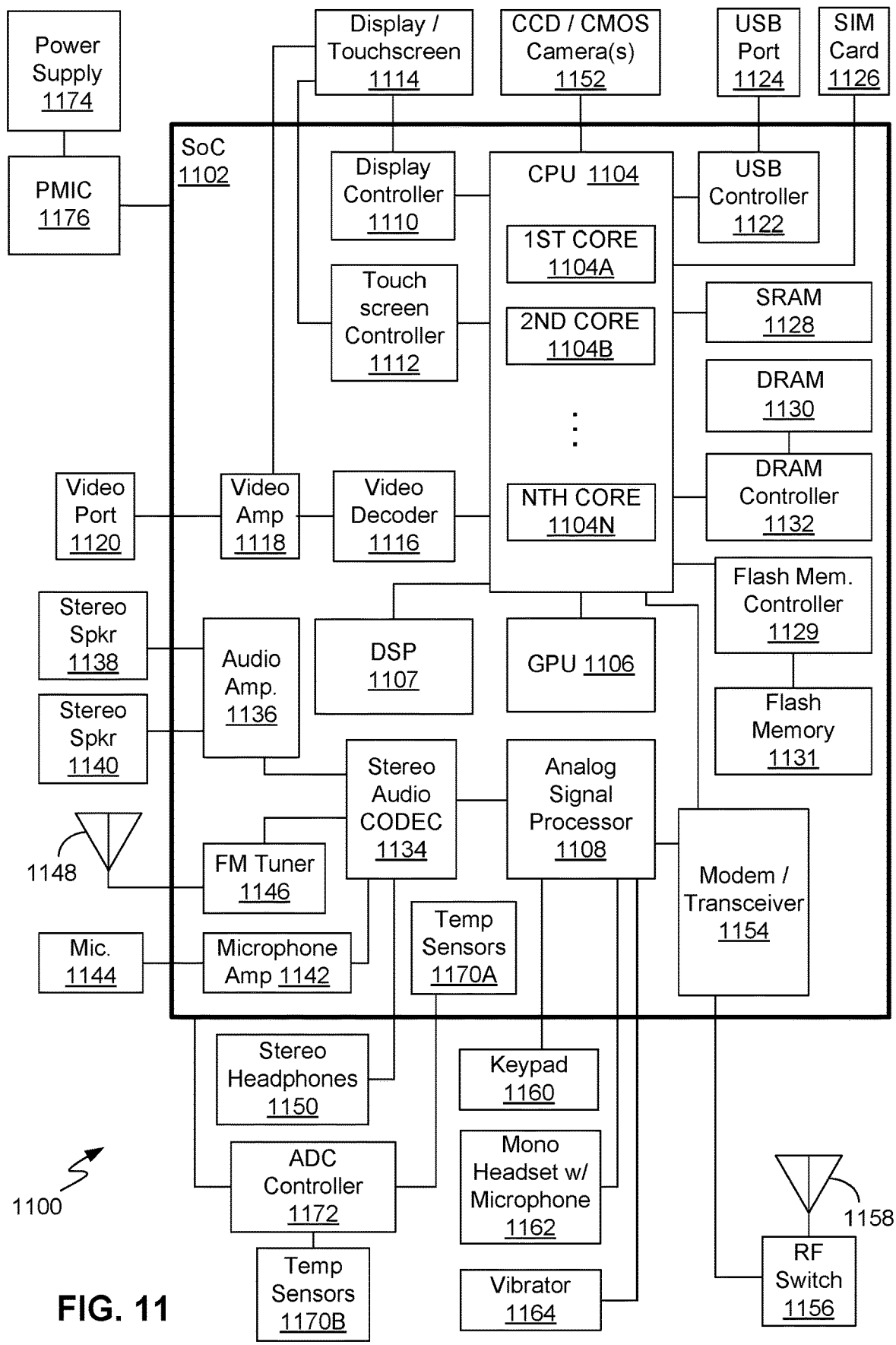
FIG. 11 is block diagram of a portable computing device, in accordance with exemplary embodiments.

FIG. 11 illustrates an example of a portable computing device ("PCD") 1100, in which exemplary embodiments of systems, methods and other examples of the above-described cryptographic solutions may be provided. The PCD 1100 may be, for example, a laptop or palmtop computer, cellular telephone or smartphone, personal digital assistant, navigation device, smartbook, portable game console, satellite telephone, etc. For purposes of clarity, some data buses, interconnects, signals, etc., are not shown in FIG. 11.

The PCD 1100 may include an SoC 1102. The SoC 1102 may include a central processing unit ("CPU") 1104, a graphics processing unit ("GPU") 1106, a digital signal processor ("DSP") 1107, an analog signal processor 1108, a radio frequency ("RF") transceiver ("modem") subsystem 1154, or other processors. The CPU 1104 may include one or more CPU cores, such as a first CPU core 1104A, a second CPU core 1104B, etc., through an Nth CPU core 1104N.

A display controller 1110 and a touch-screen controller 1112 may be coupled to the CPU 1104. A touchscreen display 1114 external to the SoC 1102 may be coupled to the display controller 1110 and the touch-screen controller 1112. The PCD 1100 may further include a video decoder 1116 coupled to the CPU 1104. A video amplifier 1118 may be coupled to the video decoder 1116 and the touchscreen display 1114. A video port 1120 may be coupled to the video amplifier 1118. A universal serial bus ("USB") controller 1122 may also be coupled to CPU 1104, and a USB port 1124 may be coupled to the USB controller 1122. A subscriber identity module ("SIM") card 1126 may also be coupled to the CPU 1104.

One or more memories may be coupled to the CPU 1104. The one or more memories may include both volatile and non-volatile memories. Examples of volatile memories include static random access memory ("SRAM") 1128 and dynamic random access memory ("DRAM") 1130. An example of a non-volatile memory is a flash memory 1131. Although such memories are shown internal to the SoC in the illustrated example, in other examples any such memory may be external to the SoC. A DRAM controller 1132 coupled to the CPU 1104 may control the writing of data to, and reading of data from, the DRAM 1130. A flash memory controller 1129 may control the writing of data to, and reading of data from, the flash memory 1131. The flash memory 1131 may be an example of the above-described data storage device 106 (FIG. 1). The flash memory controller 1129 may be an example of the above-described data storage controller 102 (FIG. 1).

A stereo audio CODEC 1134 may be coupled to the analog signal processor 1108. Further, an audio amplifier 1136 may be coupled to the stereo audio CODEC 1134. First and second stereo speakers 1138 and 1140, respectively, may be coupled to the audio amplifier 1136. In addition, a microphone amplifier 1142 may be coupled to the stereo audio CODEC 1134, and a microphone 1144 may be coupled to the microphone amplifier 1142. A frequency modulation ("FM") radio tuner 1146 may be coupled to the stereo audio CODEC 1134. An FM antenna 1148 may be coupled to the FM radio tuner 1146. Further, stereo headphones 1150 may be coupled to the stereo audio CODEC 1134. Other devices that may be coupled to the CPU 1104 include one or more digital (e.g., CCD or CMOS) cameras 1152.

The modem or RF transceiver 1154 may be coupled to the analog signal processor 1108 and the CPU 1104. An RF switch 1156 may be coupled to the RF transceiver 1154 and an RF antenna 1158. In addition, a keypad 1160, a mono headset with a microphone 1162, and a vibrator device 1164 may be coupled to the analog signal processor 1108.

The SoC 1102 may have one or more internal or on-chip thermal sensors 1170A and may be coupled to one or more external or off-chip thermal sensors 1170B. An analog-to-digital converter controller 1172 may convert voltage drops produced by the thermal sensors 1170A and 1170B to digital signals. A power supply 1174 and a power management integrated circuit ("PMIC") 1176 may supply power to the SoC 1102.

Firmware or software may be stored in any of the above-described memories, such as the DRAM 1130, SRAM 1128, flash memory 1131, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for encrypting data, comprising:
   receiving each of one or more data segments of an input data unit in a sequence on a data bus, each data segment comprising a plurality (X) of unencrypted data blocks of the input data unit, the data bus having a size of X data blocks;
   providing X tweak values for each data segment, based on a second key and an input vector, each of the X tweak values corresponding to one of the X unencrypted data blocks;
   encrypting, using X encryption circuitry blocks in parallel, the X unencrypted data blocks of each data segment into X corresponding encrypted data blocks, each of the X encryption circuitry blocks using a symmetric block cipher, a first key, and a corresponding one of the X tweak values; and
   combining the encrypted data blocks into an output data unit.

2. The method of clause 1, further comprising:
   providing an additional tweak value not corresponding to a data block of the input data unit;
   storing the additional tweak value during encryption of a jth data segment;
   comparing a stored tweak value with one of the X tweak values during encryption of a (j+1)th data segment; and
   performing an action based on a result of the comparing.

3. The method of clause 2, wherein performing an action comprises at least one of: issuing an alert; and providing substitute data in place of encryption results.

4. The method of any of clauses 1-3, wherein the symmetric block cipher comprises AES.

5. The method of any of clauses 1-4, wherein providing the plurality of tweak values comprises:
   encrypting the input vector into an initial tweak multiplier value using the second key;
   providing a plurality (X−1) of further tweak multiplier values using a first set of X−1 modular polynomial multipliers configured to multiply by a Galois Field primitive element α, the plurality of further tweak multiplier values comprising the initial tweak multiplier value multiplied by integer powers of α in a range from one through X−1; and
   multiplying the initial tweak multiplier value and each of the further tweak multiplier values by an (Xj)th power of α using a second set of X modular polynomial multipliers, wherein j is a sequential number within the input data unit of the data segment in a range from 0 to one less than an input data unit size divided by a data block size divided by X.

6. The method of clause 5, further comprising:
   providing an additional tweak multiplier value equal to an Xth power of α using an additional modular polynomial multiplier;
   providing an additional tweak value, including multiplying the additional tweak multiplier value by an (Xj)th power of α;
   storing the additional tweak value during encryption of a jth data segment;
   comparing a stored tweak value with one of the X tweak values during encryption of a (j+1)th data segment; and
   performing an action based on a result of the comparing.

7. The method of clause 6, wherein performing an action comprises at least one of: issuing an alert; and providing substitute data in place of encryption results.

8. The method of any of clauses 1-7, further comprising storing the output data unit in a non-volatile storage system.

9. A system for encrypting data, comprising:
   receiving circuitry configured to sequentially receive via a data bus each of one or more data segments of an input data unit, each data segment comprising a plurality (X) of unencrypted data blocks of the input data unit, the data bus having a size of X data blocks;
   tweak generating circuitry configured to provide X tweak values for each data segment based on a second key and an input vector, each of the X tweak values corresponding to one of the X unencrypted data blocks;
   X encryption circuitry blocks configured to encrypt in parallel the X unencrypted data blocks of each data segment into X corresponding encrypted data blocks, each of the X encryption circuitry blocks using a symmetric block cipher, a first key, and a corresponding one of the X tweak values; and
   data block combining circuitry configured to combine the encrypted data blocks into an output data unit.

10. The system of clause 9, further comprising:
additional tweak generating circuitry configured to provide an additional tweak value not corresponding to a data block of the input data unit; and
tweak validation circuitry configured to store the additional tweak value during encryption of a jth data segment, wherein j is a sequential number within the input data unit of the data segment, the tweak validation circuitry further configured to compare a stored tweak value with one of the X tweak values during encryption of a (j+1)th data segment, the tweak validation circuitry further configured to trigger an action based on a result of the comparing.

11. The system of clause 10, wherein the tweak validation circuitry is configured to, based on the result of the comparing, at least one of: issue an alert; and provide substitute data in place of encryption results.

12. The system of any of clauses clause 9-11, wherein the symmetric block cipher comprises AES.

13. The system of any of clauses 9-12, wherein the tweak generating circuitry comprises:
input vector encryption circuitry configured to encrypt the input vector into an initial tweak multiplier value using the second key;
a first set of X−1 modular polynomial multipliers configured to multiply by a Galois Field primitive element $\alpha$, the first set of X−1 modular polynomial multipliers configured to provide, when X is greater than one, a plurality (X−1) of further tweak multiplier values comprising the initial tweak multiplier value multiplied by integer powers of $\alpha$ in a range from one through X−1; and
a second set of X modular polynomial multipliers configured to multiply the initial tweak multiplier value and each of the further tweak multiplier values by an (Xj)th power of $\alpha$, wherein j is a sequential number within the input data unit of the data segment in a range from 0 to one less than an input data unit size divided by a data block size divided by X.

14. The system of clause 13, further comprising:
a first additional modular polynomial multiplier configured to provide an additional tweak multiplier value equal to the initial tweak multiplier value multiplied by an Xth power of $\alpha$;
a second additional modular polynomial multiplier configured to provide an additional tweak value, wherein the second additional modular polynomial multiplier is configured to multiply the additional tweak multiplier value by an (Xj)th power of $\alpha$;
tweak value storage circuitry configured to store the additional tweak value during encryption of a jth data segment; and
tweak value validation circuitry configured to compare a stored tweak value with one of the X tweak values during encryption of a (j+1)th data segment, the tweak value validation circuitry further configured to initiate an action based on a result of the comparing.

15. The system of any of clauses 9-14, wherein an output of the system is coupled to a non-volatile storage system and configured to provide the output data unit to the non-volatile storage system.

16. The system of clause 15, wherein the tweak value validation circuitry is configured to, based on the result of the comparing, at least one of: issue an alert; and provide substitute data in place of encryption results.

17. A system for encrypting data, comprising:
means for receiving each of one or more segments of an input data unit in a sequence on a data bus, each data segment comprising a plurality (X) of unencrypted data blocks of the input data unit, the data bus having a size of X data blocks;
means for providing X tweak values for each data segment based on a second key and an input vector, each of the X tweak values corresponding to one of the X unencrypted data blocks;
means for encrypting in parallel the X unencrypted data blocks of each data segment into X corresponding encrypted data blocks, the means for encrypting using a symmetric block cipher, a first key, and a corresponding one of the X tweak values; and
means for combining the encrypted data blocks into an output data unit.

18. The system of clause 17, further comprising:
means for providing an additional tweak value not corresponding to a data block of the input data unit;
means for storing the additional tweak value during encryption of a jth data segment, wherein j is a sequential number within the input data unit of the data segment;
means for comparing a stored tweak value with one of the X tweak values during encryption of a (j+1)th data segment; and
means for performing an action based on a result of the comparing.

19. The system of clause 18, wherein the means for performing an action comprises at least one of: means for issuing an alert; and means for providing substitute data in place of encryption results.

20. The system of any of clauses 17-19, wherein the symmetric block cipher comprises AES.

21. The system of any of clauses 17-20, wherein the means for providing the plurality of tweak values comprises:
means for encrypting the input vector into an initial tweak multiplier value using the second key;
means for providing, when X is greater than one, a plurality (X−1) of further tweak multiplier values comprising the initial tweak multiplier value multiplied by integer powers of a Galois Field primitive element $\alpha$ in a range from one through X−1; and
means for multiplying the initial tweak multiplier value and each of the further tweak multiplier values by an (Xj)th power of $\alpha$, wherein j is a sequential number within the input data unit of the data segment in a range from 0 to one less than an input data unit size divided by a data block size divided by X.

22. The system of clause 21, further comprising:
means for providing an additional tweak multiplier value equal to an Xth power of $\alpha$;
means for providing an additional tweak value, including multiplying the additional tweak multiplier value by an (Xj)th power of $\alpha$;
means for storing the additional tweak value during encryption of a jth data segment;
means for comparing a stored tweak value with one of the X tweak values during encryption of a (j+1)th data segment; and
means for performing an action based on a result of the means for comparing.

23. The system of any of clauses 17-22, wherein an output of the system is coupled to a non-volatile storage system, and the system further comprises means for providing the output data unit to the non-volatile storage system.

24. The system of clause 23, wherein the means for performing an action comprises at least one of: means for issuing an alert; and means for providing substitute data in place of encryption results.

25. A data storage cryptographic system, comprising:
memory system data buffer circuitry configured to sequentially receive via a data bus one or more data segments of an input data unit stored in a system memory, each data segment comprising a plurality (X) of unencrypted data blocks of the input data unit, the data bus having a size of X data blocks;
tweak generating circuitry configured to provide X tweak values for each data segment based on a second key and an input vector, each of the X tweak values corresponding to one of the X unencrypted data blocks;
X encryption circuitry blocks configured to encrypt in parallel the X unencrypted data blocks of each data segment into X corresponding encrypted data blocks, each of the X encryption circuitry blocks using a symmetric block cipher, a first key, and a corresponding one of the X tweak values;
data block combining circuitry configured to combine the encrypted data blocks into an output data unit; and
storage device data buffer circuitry configured to provide the output data unit to a non-volatile storage system.

26. The system of clause 25, further comprising:
additional tweak generating circuitry configured to provide an additional tweak value not corresponding to a data block of the input data unit; and
tweak validation circuitry configured to store the additional tweak value during encryption of a jth data segment, wherein j is a sequential number within the input data unit of the data segment, the tweak validation circuitry further configured to compare a stored tweak value with one of the X tweak values during encryption of a (j+1)th data segment, the tweak validation circuitry further configured to trigger an action based on a result of the comparing.

27. The system of clause 26, wherein the tweak validation circuitry is configured to, based on the result of the comparing, at least one of: issue an alert; and provide substitute data in place of encryption results.

28. The system of any of clauses 25-27, wherein the symmetric block cipher comprises AES.

29. The system of any of clauses 25-28, wherein the tweak generating circuitry comprises:
input vector encryption circuitry configured to encrypt the input vector into an initial tweak multiplier value using the second key;
a first set of X−1 modular polynomial multipliers configured to multiply by a Galois Field primitive element α, the first set of X−1 modular polynomial multipliers configured to provide, when X is greater than one, a plurality (X−1) of further tweak multiplier values comprising the initial tweak multiplier value multiplied by integer powers of α in a range from one through X−1; and
a first additional modular polynomial multiplier configured to provide an additional tweak multiplier value equal to the initial tweak multiplier value multiplied by an Xth power of α;
a second set of X modular polynomial multipliers configured to multiply the initial tweak multiplier value and each of the further tweak multiplier values by an (Xj)th power of α, wherein j is an integer in a range from 0 to one less than an input data unit size divided by a data block size divided by X, and j is a sequential number within the input data unit of the plurality (X) of data blocks;
a second additional modular polynomial multiplier configured to provide an additional tweak value, wherein the second additional modular polynomial multiplier is configured to multiply the additional tweak multiplier value by an (Xj)th power of α;
tweak value storage circuitry configured to store the additional tweak value during encryption of a jth data segment; and
tweak value validation circuitry configured to compare a stored tweak value with one of the X tweak values during encryption of a (j+1)th data segment, the tweak value validation circuitry further configured to initiate an action based on a result of the comparing.

30. The system of any of clauses 26-29, wherein the action based on the result of the comparing comprises at least one of: issuing an alert; and providing substitute data in place of encryption results.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for encrypting data, comprising:
receiving each of one or more data segments of an input data unit in a sequence on a data bus, each data segment comprising a plurality (X) of unencrypted data blocks of the input data unit, the data bus having a size of X data blocks;
providing X tweak values for each data segment, based on a second key and an input vector, each of the X tweak values corresponding to one of the X unencrypted data blocks;
encrypting, using X encryption circuitry blocks in parallel, the X unencrypted data blocks of each data segment into X corresponding encrypted data blocks, each of the X encryption circuitry blocks using a symmetric block cipher, a first key, and a corresponding one of the X tweak values;
combining the encrypted data blocks into an output data unit;
providing an additional tweak value not corresponding to a data block of the input data unit; and
storing the additional tweak value during encryption of a jth data segment, wherein j is a sequential number within the input data unit of the data segment.

2. The method of claim 1, further comprising:
comparing a stored tweak value with one of the X tweak values during encryption of a (j+1)th data segment; and
performing an action based on a result of the comparing.

3. The method of claim 2, wherein performing an action comprises at least one of: issuing an alert; and providing substitute data in place of encryption results.

4. The method of claim 1, wherein the symmetric block cipher comprises AES.

5. The method of claim 1, wherein providing the plurality of tweak values comprises:
encrypting the input vector into an initial tweak multiplier value using the second key;
providing a plurality (X−1) of further tweak multiplier values using a first set of X−1 modular polynomial multipliers configured to multiply by a Galois Field primitive element α, the plurality of further tweak multiplier values comprising the initial tweak multiplier value multiplied by integer powers of a in a range from one through X−1; and multiplying the initial tweak multiplier value and each of the further tweak multiplier values by an (Xj)th power of α using a second set of X modular polynomial multipliers, wherein j is a sequential number within the input data unit of the data segment in a range from 0 to one less than an input data unit size divided by a data block size divided by X.

6. The method of claim 5, further comprising:

providing an additional tweak multiplier value equal to an Xth power of α using an additional modular polynomial multiplier;

providing an additional tweak value, including multiplying the additional tweak multiplier value by an (Xj)th power of α;

storing the additional tweak value during encryption of a jth data segment;

comparing a stored tweak value with one of the X tweak values during encryption of a (j+1)th data segment; and performing an action based on a result of the comparing.

7. The method of claim 6, wherein performing an action comprises at least one of: issuing an alert; and providing substitute data in place of encryption results.

8. The method of claim 1, further comprising storing the output data unit in a non-volatile storage system.

9. A system for encrypting data, comprising:

receiving circuitry configured to sequentially receive via a data bus each of one or more data segments of an input data unit, each data segment comprising a plurality (X) of unencrypted data blocks of the input data unit, the data bus having a size of X data blocks;

tweak generating circuitry configured to provide X tweak values for each data segment based on a second key and an input vector, each of the X tweak values corresponding to one of the X unencrypted data blocks;

X encryption circuitry blocks configured to encrypt in parallel the X unencrypted data blocks of each data segment into X corresponding encrypted data blocks, each of the X encryption circuitry blocks using a symmetric block cipher, a first key, and a corresponding one of the X tweak values;

data block combining circuitry configured to combine the encrypted data blocks into an output data unit;

additional tweak generating circuitry configured to provide an additional tweak value not corresponding to a data block of the input data unit; and tweak validation circuitry configured to store the additional tweak value during encryption of a jth data segment, wherein j is a sequential number within the input data unit of the data segment.

10. The system of claim 9, further comprising:

the tweak validation circuitry further configured to compare a stored tweak value with one of the X tweak values during encryption of a (j+1)th data segment, the tweak validation circuitry further configured to trigger an action based on a result of the comparing.

11. The system of claim 10, wherein the tweak validation circuitry is configured to, based on the result of the comparing, at least one of: issue an alert; and provide substitute data in place of encryption results.

12. The system of claim 9, wherein the symmetric block cipher comprises AES.

13. The system of claim 9, wherein the tweak generating circuitry comprises:

input vector encryption circuitry configured to encrypt the input vector into an initial tweak multiplier value using the second key;

a first set of X−1 modular polynomial multipliers configured to multiply by a Galois Field primitive element α, the first set of X−1 modular polynomial multipliers configured to provide, when X is greater than one, a plurality (X−1) of further tweak multiplier values comprising the initial tweak multiplier value multiplied by integer powers of a in a range from one through X−1; and a second set of X modular polynomial multipliers configured to multiply the initial tweak multiplier value and each of the further tweak multiplier values by an (Xj)th power of α, wherein j is a sequential number within the input data unit of the data segment in a range from 0 to one less than an input data unit size divided by a data block size divided by X.

14. The system of claim 13, further comprising:

a first additional modular polynomial multiplier configured to provide an additional tweak multiplier value equal to the initial tweak multiplier value multiplied by an Xth power of α;

a second additional modular polynomial multiplier configured to provide an additional tweak value, wherein the second additional modular polynomial multiplier is configured to multiply the additional tweak multiplier value by an (Xj)th power of α;

tweak value storage circuitry configured to store the additional tweak value during encryption of a jth data segment; and tweak value validation circuitry configured to compare a stored tweak value with one of the X tweak values during encryption of a (j+1)th data segment, the tweak value validation circuitry further configured to initiate an action based on a result of the comparing.

15. The system of claim 14, wherein an output of the system is coupled to a non-volatile storage system and configured to provide the output data unit to the non-volatile storage system.

16. The system of claim 15, wherein the tweak value validation circuitry is configured to, based on the result of the comparing, at least one of: issue an alert; and provide substitute data in place of encryption results.

17. A system for encrypting data, comprising:

means for receiving each of one or more segments of an input data unit in a sequence on a data bus, each data segment comprising a plurality (X) of unencrypted data blocks of the input data unit, the data bus having a size of X data blocks;

means for providing X tweak values for each data segment based on a second key and an input vector, each of the X tweak values corresponding to one of the X unencrypted data blocks;

means for encrypting in parallel the X unencrypted data blocks of each data segment into X corresponding encrypted data blocks, the means for encrypting using a symmetric block cipher, a first key, and a corresponding one of the X tweak values;

means for combining the encrypted data blocks into an output data unit;

means for providing an additional tweak value not corresponding to a data block of the input data unit; and means for storing the additional tweak value during encryption of a jth data segment, wherein i is a sequential number within the input data unit of the data segment.

18. The system of claim 17, further comprising:
means for comparing a stored tweak value with one of the X tweak values during encryption of a (j+1)th data segment; and
means for performing an action based on a result of the comparing.

19. The system of claim 18, wherein the means for performing an action comprises at least one of: means for issuing an alert; and means for providing substitute data in place of encryption results.

20. The system of claim 17, wherein the symmetric block cipher comprises AES.

21. The system of claim 17, wherein the means for providing the plurality of tweak values comprises:
means for encrypting the input vector into an initial tweak multiplier value using the second key;
means for providing, when X is greater than one, a plurality (X−1) of further tweak multiplier values comprising the initial tweak multiplier value multiplied by integer powers of a Galois Field primitive element α in a range from one through X−1; and
means for multiplying the initial tweak multiplier value and each of the further tweak multiplier values by an (Xj)th power of α, wherein j is a sequential number within the input data unit of the data segment in a range from 0 to one less than an input data unit size divided by a data block size divided by X.

22. The system of claim 21, further comprising:
means for providing an additional tweak multiplier value equal to an Xth power of α;
means for providing an additional tweak value, including multiplying the additional tweak multiplier value by an (Xj)th power of α;
means for storing the additional tweak value during encryption of a jth data segment;
means for comparing a stored tweak value with one of the X tweak values during encryption of a (j+1)th data segment; and
means for performing an action based on a result of the means for comparing.

23. The system of claim 22, wherein an output of the system is coupled to a non-volatile storage system, and the system further comprises means for providing the output data unit to the non-volatile storage system.

24. The system of claim 23, wherein the means for performing an action comprises at least one of: means for issuing an alert; and means for providing substitute data in place of encryption results.

25. A data storage cryptographic system, comprising:
memory system data buffer circuitry configured to sequentially receive via a data bus one or more data segments of an input data unit stored in a system memory, each data segment comprising a plurality (X) of unencrypted data blocks of the input data unit, the data bus having a size of X data blocks;
tweak generating circuitry configured to provide X tweak values for each data segment based on a second key and an input vector, each of the X tweak values corresponding to one of the X unencrypted data blocks;
X encryption circuitry blocks configured to encrypt in parallel the X unencrypted data blocks of each data segment into X corresponding encrypted data blocks, each of the X encryption circuitry blocks using a symmetric block cipher, a first key, and a corresponding one of the X tweak values;
data block combining circuitry configured to combine the encrypted data blocks into an output data unit;
storage device data buffer circuitry configured to provide the output data unit to a non-volatile storage system;
additional tweak generating circuitry configured to provide an additional tweak value not corresponding to a data block of the input data unit; and
tweak validation circuitry configured to store the additional tweak value during encryption of a jth data segment, wherein j is a sequential number within the input data unit of the data segment.

26. The system of claim 25,
wherein the tweak validation circuitry is further configured to compare a stored tweak value with one of the X tweak values during encryption of a (j+1)th data segment, the tweak validation circuitry further configured to trigger an action based on a result of the comparing.

27. The system of claim 26, wherein the tweak validation circuitry is configured to, based on the result of the comparing, at least one of: issue an alert; and provide substitute data in place of encryption results.

28. The system of claim 25, wherein the symmetric block cipher comprises AES.

29. The system of claim 25, wherein the tweak generating circuitry comprises:
input vector encryption circuitry configured to encrypt the input vector into an initial tweak multiplier value using the second key;
a first set of X−1 modular polynomial multipliers configured to multiply by a Galois Field primitive element α, the first set of X−1 modular polynomial multipliers configured to provide, when X is greater than one, a plurality (X−1) of further tweak multiplier values comprising the initial tweak multiplier value multiplied by integer powers of a in a range from one through X−1; and
a first additional modular polynomial multiplier configured to provide an additional tweak multiplier value equal to the initial tweak multiplier value multiplied by an Xth power of α;
a second set of X modular polynomial multipliers configured to multiply the initial tweak multiplier value and each of the further tweak multiplier values by an (Xj)th power of α, wherein j is an integer in a range from 0 to one less than an input data unit size divided by a data block size divided by X, and j is a sequential number within the input data unit of the plurality (X) of data blocks;
a second additional modular polynomial multiplier configured to provide an additional tweak value, wherein the second additional modular polynomial multiplier is configured to multiply the additional tweak multiplier value by an (Xj)th power of α;
tweak value storage circuitry configured to store the additional tweak value during encryption of a jth data segment; and
tweak value validation circuitry configured to compare a stored tweak value with one of the X tweak values during encryption of a (j+1)th data segment, the tweak value validation circuitry further configured to initiate an action based on a result of the comparing.

30. The system of claim 29, wherein the action based on the result of the comparing comprises at least one of: issuing an alert; and providing substitute data in place of encryption results.

* * * * *